Jan. 29, 1924.
V. LAZARO ET AL
RESILIENT WHEEL FOR VEHICLES
Filed Sept. 19, 1922
1,481,852
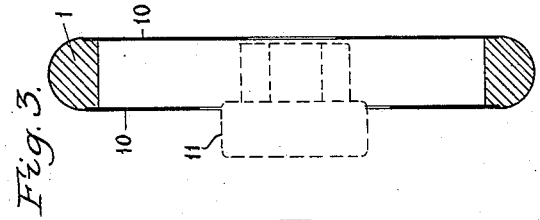
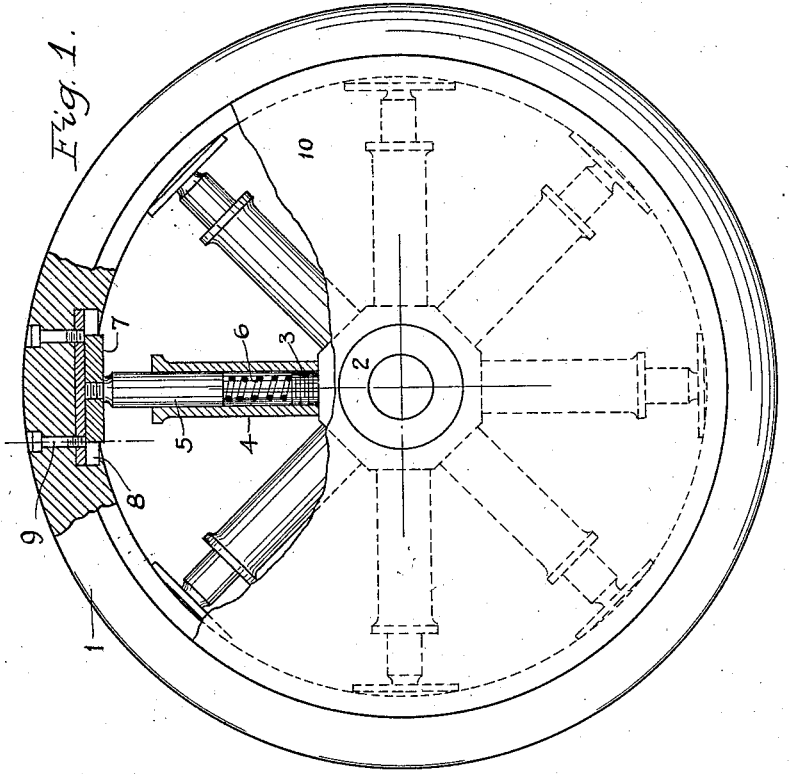
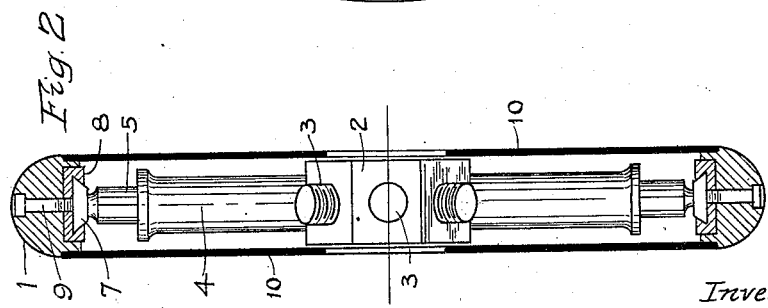
Inventors:
Vicente Lazaro
Bernardino Lazaro
By Wm Wallace White
Attorney.

Patented Jan. 29, 1924.

1,481,852

UNITED STATES PATENT OFFICE.

VICENTE LAZARO AND BERNARDINO LAZARO, OF BUENOS AIRES, ARGENTINA.

RESILIENT WHEEL FOR VEHICLES.

Application filed September 19, 1922. Serial No. 589,084.

*To all whom it may concern:*

Be it known that we, VICENTE LAZARO and BERNARDINO LAZARO, subjects of the King of Spain, residing at No. 1171 Rivadavia Street, Buenos Aires, Argentina, have invented certain new and useful Improvements in Resilient Wheels for Vehicles, of which the following is a specification.

This invention relates to an improved resilient wheel for vehicles and substantially has for its object a wheel in which the resilient element is arranged between the hub of the wheel and the rim, the construction of the same being such as to allow, mechanically speaking, of a normal and reliable working of the several parts which permit of the eccentricity of the rim in relation to the axle.

The improved wheel which forms the object of this invention, comprises telescoping spokes, in the interior of which is suitably mounted a spring. This construction allows of the length of the spoke to vary, while its position with regard to the axle remains fixed, the spokes being radially secured to the hub of the wheel. In order to allow of its lateral displacement in relation to the rim, the connection between the spokes and the rim is performed by means of a slidable device which comprises a guide piece secured to the rim and a slide affixed to the end of the spoke.

The invention will be more readily understood by referring to the accompanying drawing which by way of example illustrates a preferred embodiment of the same. In said drawing:

Figure 1 shows a front view, partially sectional, of a wheel without brake drum, constructed in accordance with this invention.

Figure 2 illustrates a cross section of the same.

Figure 3 shows a cross section of a wheel constructed to be used with brake drum and having in consequence lateral plates of different size.

The rim 1 of the resilient wheel in accordance with our invention, is rigid and has been shown as constituting a solid tire. The rim may be made of a single piece or of several parts or sections, of hard wood, iron or the like and may also carry a detachable tire of resilient material, or a steel rim.

Said rim is connected to the hub 2 of the wheel by means of elastic spokes, in the manner now to be described. The hub is provided on its periphery with a series of threaded studs 3, onto which are screwed by one of their ends the spoke tubes 4, in the interior of which slides with a neat fit the stem 5.

The spoke tubes 4 are of a length slightly less than the distance between the hub and the rim, so as not to come into contact with said rim during their displacement from the centre of the hub and the rim, respectively.

The inner end of the stem 5 bears on a compression spring 6, arranged within the interior of the tube 4 and which in turn bears on the stud 3.

The said compression spring may be replaced, if desired, by a suitable air chamber, a piece of rubber or other resilient material.

The other end of the stem protrudes out of the spoke tube and is threaded into the centre of a plate 7, mounted at right angles to said end.

Said plate 7 forms a slide adapted to slide within a guideway formed in a plate 8, secured on the inner face of the rim by means of the screws 9. For the purpose of preventing the detachment of the parts 7 and 8, the slide 7 and its guideway are of trapezoidal or dovetail shape in cross section, the larger base or side of the plate 7 being disposed in contact with the bottom wall of the guide way.

The guide way is of greater length than the slide, as shown in Fig. 1 for allowing the latter to perform the necessary working movement.

The spokes are shown herein as eight in number, but it will be evident that their number may be varied as may be deemed convenient.

On each side of the wheel, a lateral plate or sheet 10 is secured to the rim, so as to entirely enclose the spokes and thereby protect the same against the entrance of dust and water. Said plates are provided with a central opening, somewhat larger than the circumference of the axle, so as not to come into contact with the same during the eccentricity of the rim.

In the case of a wheel provided with a brake drum 11 or where the hub or spokes are formed integral with a sprocket, it will be evident that the lateral plate corresponding to the respective side must be provided with a central opening larger than the periphery of said drum or sprocket, as clearly shown in Figure 3.

Instead of securing the protecting plate to the rim, the same might as well be affixed to the hub of the wheel, in which case the outer diameter should be somewhat smaller than that of the plate secured to the rim, so as to prevent the same from coming into contact with the ground.

The operation of this elastic wheel is as follows:—

The load of the vehicle transmitted to the wheel by the axle and the obstructions encountered thereby on the road which raise the wheels owing to the inertia of the vehicle during running, are two causes which cooperate in causing the axle to approach the ground, such movement being allowed by the resiliency of the inner spring of the spokes. Therefore, the centre of the rim will always be eccentric in relation to the axle or centre of the hub. The displacement of the one in relation to the other is rendered possible by the fact that the spoke slides by means of the stem within the tube.

However, as the spokes are rigid with the hub as regards their direction, those spokes which extend in a direction not corresponding with the line of displacement of the centres of the axle and the rim, will accordingly shift in relation to said rim, by sliding by means of the slide.

In consequence, the centre of the hub may shift in any direction in relation to the centre of the rim.

For instance, when the line of said centres is vertical, the slide of the vertical spokes will remain at the centre of the slide way, while in the horizontal spokes, the stems and the springs of the same will remain in their normal position and with regard to the spokes situated between these two positions, the stems as well as the slides will shift simultaneously.

It is to be understood that the details of construction and arrangement of the parts constituting this invention, may be varied within the scope of the claims hereunto appended.

We now declare that what we claim as new and desire to secure by Letters Patent of the United States, is:—

1. A resilient wheel, comprising, in combination, a hub, a rim, a plurality of spokes connecting said hub and rim and adapted to permit movement of the rim radially of the hub, plates, one for each of said spokes, secured in said rim and each having a guideway of dovetail form in cross section opening at the inner periphery of the rim, and a plate secured to the outer end of each of said spokes and having its side edges inclined to fit said guideway, the guideways being of greater length than said spoke plates thereby to permit circumferential movement of the rim relatively to the hub.

2. A resilient wheel, comprising, in combination, a hub, a rim, a plurality of spokes connecting said hub and rim, each of said spokes comprising a pair of telescoping members, one secured rigidly to the hub, the other having secured at its outer end a plate extending at right angles thereto, and a plurality of plates secured in said rim, one for each of said spokes, said rim plates each having a guideway for the reception of the spoke plates, the formation of said guideway being such as to prevent radial movement of the spokes relatively to the rim, the length of the guideway being such as to permit the spoke plates to move tangentially of said rim.

In testimony whereof we affix our signatures.

VICENTE LAZARO.
BERNARDINO LAZARO.